United States Patent Office 3,098,081
Patented July 16, 1963

3,098,081
PROCESS FOR PURIFYING TRIPHENYL METHANE DYES
Josef Pikl, Glassboro, N.J., assignor to E. I. du Pont de Nemours and Company, Wilmington, Del., a corporation of Delaware
No Drawing. Filed Sept. 6, 1960, Ser. No. 53,916
3 Claims. (Cl. 260—393)

Certain triphenylmethane dyes have been sold for use in dyeing acrylic fibers for several years. The dyeing of acrylic fibers with various triphenylmethane dyes is more fully described in U.S. Patent 2,764,466, German Patent 949,649, A. P. Roy, American Dyestuff Reporter, 41, 846 (1952), I.M.S. Walls, J. Soc. Dyers and Colourists 72, 261 (1956), H. Schoenefeld, Textil- u. Faserstofftechnik, 6, 205 (1956), W. Beckmann and O. Glenz, Melliand Textilber, 38, 296 (1957), and B. Kramrisch, J. Soc. Dyers and Colourists 73, 85 (1957). These dyes are frequently made by first reacting aldehydes such as benzaldehyde or a halogen derivative thereof with aromatic amines such as aniline or toluidine to form the leuco derivatives. The latter are oxidized to the dye salts which are purified and isolated, preferably from aqueous solutions.

This invention relates to a novel method for isolating and purifying the oxidized form of the leuco triphenylmethane dyes containing primary amino groups, said dyes having been oxidized with chloranil as hereinafter described.

Methods of condensing o-chlorobenzaldehyde with o-toluidine, followed by oxidation of the leuco derivative to the dye salt form of the triarylmethane dye, are described in German Patent 487,458. By following the usual salting techniques for isolating triphenylmethane dyes, the products obtained according to said patent are obtained in the form of tars. When an aqueous solution of the dye salt form of these dyes is treated with an alkali, such as sodium carbonate or ammonia, the carbinol form is obtained but in a sticky form which is not filterable on a commercial scale. It is also known that said dye salt dissolves in hot (boiling) water only to the extent of less than one percent. Thus, isolation and purification of these dyes from aqueous solution requires equipment of enormous volume so that the method is impractical from this standpoint even through the dye might be filterable.

The products obtained according to this invention are valuable dyes for acid-modified acrylic and polyester fibers. These products are obtained in high yield and effect high quality colors as exemplified by their strength, brightness and fastness properties.

It is an object of the present invention to isolate and purify significantly valuable chloranil oxidized leuco triphenylmethane dyes for the dyeing of acid-modified acrylic and polyester fibers. It is a further object of this invention to provide a novel process for isolating and purifying the hereinafter-described triphenylmethane dyes in a readily filterable form from concentrated solutions of said dyes. These and other objects will become apparent in the following description and claims.

The present invention is applicable to those dyes produced by the chloranil oxidation of a leuco triphenylmethane compound of the formula

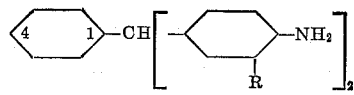

wherein R is H, $CH_3$ or $C_2H_5$, and the numbered phenyl radical carries chlorine in the 2-, 4-, 2,4-, 2,5- or 2,6- positions; 1 mole of said leuco compound and at least 1 mole of chloranil, optionally with heating, are agitated in a water-immiscible solvent (or mixture of solvents) selected from the group consisting of chlorobenzene, o-dichlorobenzene, nitrobenzene and o-nitrotoluene; this novel process may be followed by hot, acidic aqueous extraction of pure dye salt at a pH of 5.0 or below, and subsequent precipitation of the water-insoluble carbinol by means of alkali, and isolation of said carbinol. Preferred dyes are those (1) where R is $CH_3$ and chlorine occupies the 2,4-positions; (2) where R is $CH_3$ and chlorine occupies the 2-position, and, (3) where R is $C_2H_5$ and chlorine occupies the 2-position.

More specifically, the present invention is directed to a novel process for purifying a triphenylmethane dye the cation of which has the formula:

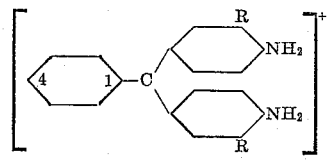

wherein R is H, $CH_3$ or $C_2H_5$ and the numbered phenyl radical contains chlorine in the 2-, 4-, 2,4-, 2,5- or 2,6- positions, in which process a water-soluble alcohol solution of said dye, 10 to 90% by weight alcohol, is dissolved at a temperature within the range of 20° C. to 90° C., for a period of from ½ to 16 hours, said water-soluble alcohol solution containing from 10% to about 30%, by weight, of said dye.

The water-soluble alcohols operable to produce the significant results achieved according to this invention are:

Methanol
Ethanol
Isopropyl alcohol
n-Propyl alcohol
Tertiary butyl alcohol
Ethylene glycol Mixtures of the heretofore-described alcohols may be utilized in the practice of this novel process.

The concentration of the alcohol in the water solution thereof utilized will range from 10% to 90% by weight of said solution. Concentrations below 10% will generally not completely dissolve the dye and at concentrations above 90%, such impurities as are present tend to dissolve along with the dye.

The temperature range for practicing the present invention will vary from 20° C. to 90° C. Below a temperature of 20° C., the operating conditions are too impractical; above 90° C. the alcohol component will tend to boil out. The time limit for dissolving the dye in the alcohol water solution according to this process varies from ½ to 16 hours depending on temperature utilized and the concentration of alcohol in the alcohol in the alcohol water solution.

The present novel process may be conducted as a batch or a continuous process. A batch process is preferred. Mixtures of the herein-described triphenylmethane dyes may be treated according to the present invention.

In general, the dye product will be present in the water-soluble alcohol solution in an amount within the range of from 10% to 30%, by weight of said water-soluble alcohol solution. Below a 10% concentration the results achieved are impractical due to the large volume required and above a 30% concentration the solution tends to thicken and becomes difficult to filter unless kept hot.

Representative examples illustrating the present invention follow.

EXAMPLE 1

(a) *Oxidation Step*

30 parts of the leuco compound bis(4-amino-m-tolyl)- (o-chlorophenyl)methane (prepared from o-chlorobenzaldehyde, o-toluidine and o-toluidine hydrochloride by well-known methods) are added to 80 parts of nitrobenzene and then 28 parts of chloranil are added gradually. The reaction mixture is then heated and agitated for 5 hours at 65° to 70° C. When the oxidation is completed, most of the dye is in solution. 80 parts of tetrachloroethylene are added slowly and the reaction mass is allowed to cool to room temperature. The precipitated dye is filtered off and washed with tetrachloroethylence to remove the nitrobenzene. The filter cake gives 58 parts of dried product.

(b) *Purification of Dye Salt and Isolation of Carbinol*

28 parts of the dried product, as obtained in (a) above, are agitated at room temperature (20 to 25° C.) for 3 hours in a solvent mixture consisting of 80 parts of methanol and 20 parts of water. The solution of dye is then filtered to remove insoluble impurities, and the filter cake is washed with the solvent mixture consisting of 32 parts of methanol and 8 parts of water. The combined filtrates are added slowly to a solution of 50 parts of sodium chloride and 6 parts of sodium carbonate in 500 parts of water at 60° C. After agitating the suspension of dye for one-half hour, the carbinol derivative is completely precipitated in a readily filterable form. The carbinol is filtered off and washed with water until chloride-free. After drying, 17 parts of the dye are obtained.

One part of the final dye is completely soluble in 200 parts of hot water containing a small amount of acid such as acetic, hydrochloric or sulfamic.

Similar results are obtained in this example when the water-alcohol mixture used in part (b) consists of 60 parts of methanol and 40 parts of water. Likewise, one obtains excellent results when the water-alcohol mixture in this example consists of water-ethanol solutions made up in 40–60 or 20–80 ratios, respectively, and the crude dye salt is dissolved therein at 40° C.

When pure methanol or ethanol are employed to dissolve the crude dye salt, otherwise operating as in part (b) of this example, the final dye has poor solubility in water and is unsatisfactory in quality, thus giving specky dyeings on acid-modified acrylic fiber.

EXAMPLE 2

28 parts of the dye obtained in part (a) of Example 1 are agitated at 72° C. for 1 hour with 100 parts of a methanol-water mixture containing 20% methanol by weight. After filtration at this temperature, the carbinol form is isolated from the filtrate by the method described in part (b) of Example 1. The dye obtained is equal in quality to the carbinol prepared in Example 1.

Similar results are obtained in this example when 100 parts of a methanol-water mixture containing 40% methanol by weight and a temperature of 50° C. are employed to dissolve the crude dye salt.

Operating as in the previous paragraph, but using 100 parts of a 10% methanol solution, the dye is incompletely dissolved and a thick mass is obtained which cannot be processed.

EXAMPLE 3

(a) *Oxidation Step*

30 parts of the leuco compound bis(4-amino-m tolyl)-(o-chlorophenyl)methane are added to 180 parts of monochlorobenzene and then 33 parts of chloranil are added gradually. The reaction mixture is then heated and agitated for 5 hours at 65° to 70° C. When the oxidation is completed most of the color formed has precipitated. The reaction product is filtered at 30° C., the filter cake is washed with 100 parts of monochlorobenzene followed by washing with 200 parts of cold water, and then dried.

(b) *Purification of Dye Salt and Isolation of Carbinol*

30 parts of the dried product obtained in part (a) of this example are agitated at room temperature for 16 hours in 100 parts of an isopropanol-water mixture containing 60% isopropanol by weight. The dissolved dye is filtered from the insoluble impurities and the filtrate is poured slowly into a solution of 50 parts of sodium chloride and 6 parts of sodium carbonate in 500 parts of water at 60° C. The precipitated carbinol is readily filtered off in good yield and quality.

EXAMPLE 4

44 parts of the dye salt as obtained in Example 1(a) are agitated with 200 parts of an isopropanol-water mixture containing 10% by weight of isopropanol, for 0.5 hour at 90° C. The dissolved dye is then separated from insoluble impurities by filtration at 90° C., and the filtrate (at 70° C.) is added to 100 parts of water (at 50° C.) containing 9 parts of sodium carbonate. The precipitated carbinol is filtered off, washed with water until free of alkali and then dried. The dye is obtained in good yield and quality.

EXAMPLE 5

123 parts of the dye salt as obtained in Example 3(a) are agitated 16 hours at 20° to 30° C. in a mixture consisting of 276 parts of methanol and 149 parts of water. The dissolved dye is separated from insoluble impurities by filtration and the filtrate is slowly added to a solution, at 45° to 55° C., consisting of 420 parts of water and 25.5 parts of sodium carbonate. The precipitated carbinol is filtered off, washed with water until alkali-free, and dried. The dye is obtained in good yield and quality.

Generally, the aqueous alcohol solution of the dye salt will be added to the aqueous alkali at a temperature of about 45° C. up to the boiling point of the alcohol water solution.

Other alkali which may be utilized according to the preceding examples include ammonium hydroxide, sodium hydroxide, potassium hydroxide and potassium carbonate.

The present invention encompasses many variations and modifications as will be clearly understood by one skilled in the art. Any of the herein-described dyes and alcohols may be utilized, according to the preceding representative examples, to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. The process of purifying a chloranil-oxidized triphenylmethane dye, the cation of which has the formula

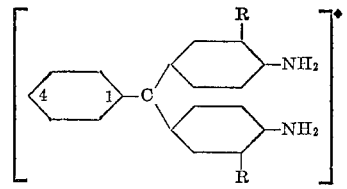

wherein R is selected from the group consisting of H, $CH_3$ and $C_2H_5$, the numbered phenyl radical containing chlorine in a known position taken from the group consisting of the 2-, 4-, 2,4- 2,5- and 2,6-positions, said process being one wherein said dye is dissolved in an aqueous water-soluble alcohol solution, the alcohol component of said solution being present in an amount within the range of 10% to 90% by weight of said solution, said alcohol component being selected from the group consisting of methanol, ethanol, isopropyl alcohol, n-propyl alcohol, tertiary butyl alcohol, ethylene glycol, and mixtures of said alcohols, said dye being dissolved therein at a temperature within the range of 20° C. to 90° C., said aqueous water-soluble alcohol solution having from 10% to about 30% by weight thereof of said dye dissolved therein, followed by filtration to remove insoluble impurities.

2. The process of claim 1 wherein the alcohol is methanol.

3. The process of claim 1 followed by adding the aqueous alcohol solution of the dye salt to an aqueous alkali solution and then filtrating off the completely precipitated carbinol form of the dye.

References Cited in the file of this patent

UNITED STATES PATENTS

| 1,470,555 | Craver | Oct. 9, 1923 |
| 1,878,530 | Kyrides | Sept. 20, 1932 |
| 2,366,179 | Chalkley | Jan. 2, 1945 |

FOREIGN PATENTS

| 2,515 | Great Britain | 1879 |
| 12,181 | Great Britain | 1897 |